(12) United States Patent
Yamamoto et al.

(10) Patent No.: US 10,434,893 B2
(45) Date of Patent: Oct. 8, 2019

(54) VEHICLE ELECTRIC POWER SUPPLY APPARATUS AND ELECTRIC VEHICLE

(71) Applicant: HONDA MOTOR CO., LTD., Minato-ku, Tokyo (JP)

(72) Inventors: Yosuke Yamamoto, Wako (JP); Masakazu Yoshii, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/986,888

(22) Filed: May 23, 2018

(65) Prior Publication Data
US 2018/0345817 A1 Dec. 6, 2018

(30) Foreign Application Priority Data
May 31, 2017 (JP) .................................. 2017-108509

(51) Int. Cl.
*B60K 1/04* (2019.01)
*B60L 11/18* (2006.01)
(Continued)

(52) U.S. Cl.
CPC ............ *B60L 11/1877* (2013.01); *B60K 1/04* (2013.01); *B60L 50/64* (2019.02); *B60L 50/66* (2019.02); *B60L 58/26* (2019.02); *H01M 2/1072* (2013.01); *H01M 10/613* (2015.04); *H01M 10/625* (2015.04); *H01M 10/6569* (2015.04);
(Continued)

(58) Field of Classification Search
CPC ...... B60L 11/1877; B60L 50/66; B60L 50/64; B60L 58/26; B60L 11/1879; B60L 11/1874; H01M 10/625; H01M 10/613; H01M 2/1072; H01M 10/6569; H01M 2220/20;
(Continued)

(56) References Cited

U.S. PATENT DOCUMENTS 9,203,066 B2 * 12/2015 Watanabe ........... H01M 2/1077
9,236,590 B2 * 1/2016 Aoki ................... H01M 2/1077
(Continued)

FOREIGN PATENT DOCUMENTS

JP   2004-345454   12/2004
JP   2015-041611    3/2015
(Continued)

OTHER PUBLICATIONS

Japanese Office Action for Japanese Patent Application No. 2017-108509 dated Oct. 23, 2018.
(Continued)

*Primary Examiner* — Jacob B Meyer
(74) *Attorney, Agent, or Firm* — Amin, Turocy & Watson LLP

(57) ABSTRACT

A vehicle electric power supply apparatus includes: a battery case; a battery that is arranged in the battery case; a first electric device that is arranged in the battery case and that is connected to at least the battery; and a battery cooling circuit that is configured to allow a refrigerant to flow through a pipe and cool at least the battery. A lower surface of the first electric device is lower than an upper surface of the battery and is positioned higher than a fluid level of the refrigerant in a state where the refrigerant that flows through the pipe is accumulated inside the battery case.

8 Claims, 3 Drawing Sheets

(51) Int. Cl.
*H01M 2/10* (2006.01)
*H01M 10/625* (2014.01)
*H01M 10/6569* (2014.01)
*H01M 10/613* (2014.01)
*B60L 58/26* (2019.01)
*B60L 50/60* (2019.01)
*B60L 50/64* (2019.01)
*B60K 1/00* (2006.01)

(52) U.S. Cl.
CPC .................. *B60K 2001/005* (2013.01); *B60K 2001/0438* (2013.01); *H01M 2220/20* (2013.01)

(58) Field of Classification Search
CPC ............. B60K 1/04; B60K 2001/0438; B60K 2001/005
See application file for complete search history.

(56) References Cited

U.S. PATENT DOCUMENTS

| | | | | |
|---|---|---|---|---|
| 9,566,859 | B2* | 2/2017 | Hatta | .................... B60K 11/06 |
| 9,997,810 | B2* | 6/2018 | Tajima | ................ H01M 10/625 |
| 2011/0020676 | A1* | 1/2011 | Kurosawa | ................ B60K 1/04 |
| | | | | 429/62 |
| 2011/0206967 | A1* | 8/2011 | Itsuki | ...................... B60K 1/04 |
| | | | | 429/120 |
| 2013/0011713 | A1* | 1/2013 | Harada | ............... H01M 2/1077 |
| | | | | 429/120 |
| 2013/0052490 | A1* | 2/2013 | TenHouten | ........ B60H 1/00278 |
| | | | | 429/50 |
| 2013/0084477 | A1* | 4/2013 | Watanabe | ........... H01M 2/1077 |
| | | | | 429/82 |
| 2015/0291019 | A1* | 10/2015 | Hatta | .................... B60K 11/06 |
| | | | | 180/68.2 |
| 2017/0271727 | A1* | 9/2017 | Ito | ........................... B60K 1/04 |
| 2017/0305293 | A1* | 10/2017 | Takizawa | ................. B60K 1/04 |
| 2018/0345817 | A1* | 12/2018 | Yamamoto | .......... B60L 11/1877 |

FOREIGN PATENT DOCUMENTS

| | | |
|---|---|---|
| JP | 2015-107728 | 6/2015 |
| JP | 2017-004919 | 1/2017 |
| WO | 2014/122904 | 8/2014 |

OTHER PUBLICATIONS

Japanese Office Action for Japanese Patent Application No. 2017-108509 dated Jun. 4, 2019.

* cited by examiner

VEHICLE ELECTRIC POWER SUPPLY APPARATUS AND ELECTRIC VEHICLE

CROSS-REFERENCE TO RELATED APPLICATION

Priority is claimed on Japanese Patent Application No. 2017-108509, filed on May 31, 2017, the contents of which are incorporated herein by reference.

BACKGROUND

Field of the Invention

The present invention relates to a vehicle electric power supply apparatus that is provided on an electric vehicle such as an electric automobile and a hybrid automobile and an electric vehicle that includes the vehicle electric power supply apparatus.

Background

A configuration (vehicle electric power supply apparatus) in which an electric device such as a battery and a junction board that is connected to the battery is arranged on an upper surface of a base and which allows a refrigerant (coolant) to flow through the piping and cools the battery is disclosed in Japanese Patent Application, Publication No. 2015-107728A. Further, Japanese Patent Application, Publication No. 2015-107728A discloses that the vehicle electric power supply apparatus that includes the battery and the electric device is arranged below a floor panel.

SUMMARY

In a vehicle electric power supply apparatus, a battery and an electric device may be stored in an identical case (battery case). In such a configuration, part of the piping is arranged in the battery case. Therefore, if a worker mistakes the sequence of operation at the time of a maintenance and disassembles the piping before draining the refrigerant, there is a possibility that the refrigerant in the piping is erroneously discharged into the battery case, the refrigerant is accumulated inside the battery case, thereby the electric device in the battery case is exposed to the refrigerant, and a failure arises at the electric device.

Further, when it is considered only to prevent the electric device from being exposed to a liquid, and the electric device is arranged in the case, there is a possibility that the height of the vehicle electric power supply apparatus is increased. In this case, the vehicle room space of the vehicle may be reduced, and this is not preferable.

An object of an aspect of the present invention is to provide a vehicle electric power supply apparatus and an electric vehicle that includes the vehicle electric power supply apparatus capable of preventing an electric device from being exposed to a liquid while reducing the height of the vehicle electric power supply apparatus.

(1) An aspect of the present invention is a vehicle electric power supply apparatus that is arranged below a floor panel, including: a battery case; a battery that is arranged in the battery case; a first electric device that is arranged in the battery case and that is connected to at least the battery; and a battery cooling circuit that is configured to allow a refrigerant to flow through a pipe and cool at least the battery, wherein a lower surface of the first electric device is lower than an upper surface of the battery and is positioned higher than a fluid level of the refrigerant in a state where the refrigerant that flows through the pipe is accumulated inside the battery case.

(2) The vehicle electric power supply apparatus described above may include a second electric device that is arranged in the battery case and that is connected to at least the battery, wherein the second electric device may be arranged at a gap between the lower surface of the first electric device and a bottom part of the battery case in a state where a waterproof treatment is applied to the second electric device.

(3) In the vehicle electric power supply apparatus described above, the battery cooling circuit may be configured to allow the refrigerant to flow through the battery and the second electric device in order.

(4) In the vehicle electric power supply apparatus described above, the battery cooling circuit may include: a main flow path that is configured to allow the refrigerant to flow through both the battery and the second electric device; a bypass flow path that branches from the main flow path at a more upstream side in a flow direction of the refrigerant than the battery and the second electric device and that is configured to allow the refrigerant to flow through the second electric device in priority to the battery; and a switch valve that is configured to switch a flow of the refrigerant to any of the main flow path and the bypass flow path.

(5) An electric vehicle according to another aspect of the present invention includes: the vehicle electric power supply apparatus described above; and a floor panel that is arranged above the vehicle electric power supply apparatus, wherein a region that is part of the floor panel and that is arranged above the first electric device constitutes a footrest space of an occupant.

According to the configuration (1) described above, even when the refrigerant in the pipe of the battery cooling circuit is erroneously discharged into the battery case and is accumulated inside the battery case, the first electric device is positioned higher than the fluid level of the refrigerant that is accumulated inside the battery case. Thereby, it is possible to prevent the first electric device from being exposed to a liquid. Further, the lower surface of the first electric device is positioned lower than the upper surface of the battery, and thereby, it is possible to reduce the height of the vehicle electric power supply apparatus compared to a case in which the first electric device is mounted on the upper side of the battery. Accordingly, it is possible to prevent the first electric device from being exposed to a liquid while reducing the height of the vehicle electric power supply apparatus.

According to the configuration (2) described above, the gap between the first electric device and the bottom part of the battery case is effectively used for the arrangement of the second electric device. Therefore, even when the number of electric devices that are arranged in the battery case is increased, it is possible to prevent the size of the vehicle electric power supply apparatus from being increased. Further, since a waterproof treatment is applied to the second electric device, even when part or all of the second electric device is positioned lower than the fluid level of the refrigerant that is accumulated inside the battery case, it is possible to prevent a failure from arising at the second electric device.

According to the configuration (3) described above, it is possible to cool the battery in priority to the second electric device. Specifically, when the thermal resistance of the battery is inferior to the second electric device (when the control temperature of the battery is lower than the second electric device), it is possible to reliably cool the battery having an inferior thermal resistance without being subject to the effect of the temperature of the second electric device.

According to the configuration (4) described above, it is possible to selectively cool the battery. For example, when the temperature of the battery is low by the effect of surrounding environments (for example, a cold climate) and the like in a state where the battery and the second electric device are being operated, by allowing the refrigerant of the battery cooling circuit to flow through the bypass flow path, it is possible to effectively cool the second electric device. Further, it is also possible to warm the battery to an appropriate temperature. On the other hand, when the temperature of the battery is high, by allowing the refrigerant of the battery cooling circuit to flow through the main flow path, it is possible to cool both the battery and the second electric device.

According to the configuration (5) described above, by using the region of the floor panel that is positioned above the first electric device having a reduced height position in the vehicle electric power supply apparatus as a footrest space of an occupant, it is possible to prevent the height size of the vehicle room space above the footrest space from being decreased. That is, it is possible to prevent the vehicle room space above the floor panel from being decreased (specifically, the height size of the vehicle room space from being decreased).

DESCRIPTION OF THE EMBODIMENTS

Hereinafter, an embodiment of the present invention is described with reference to FIGS. 1 to 4.

Figure 1:
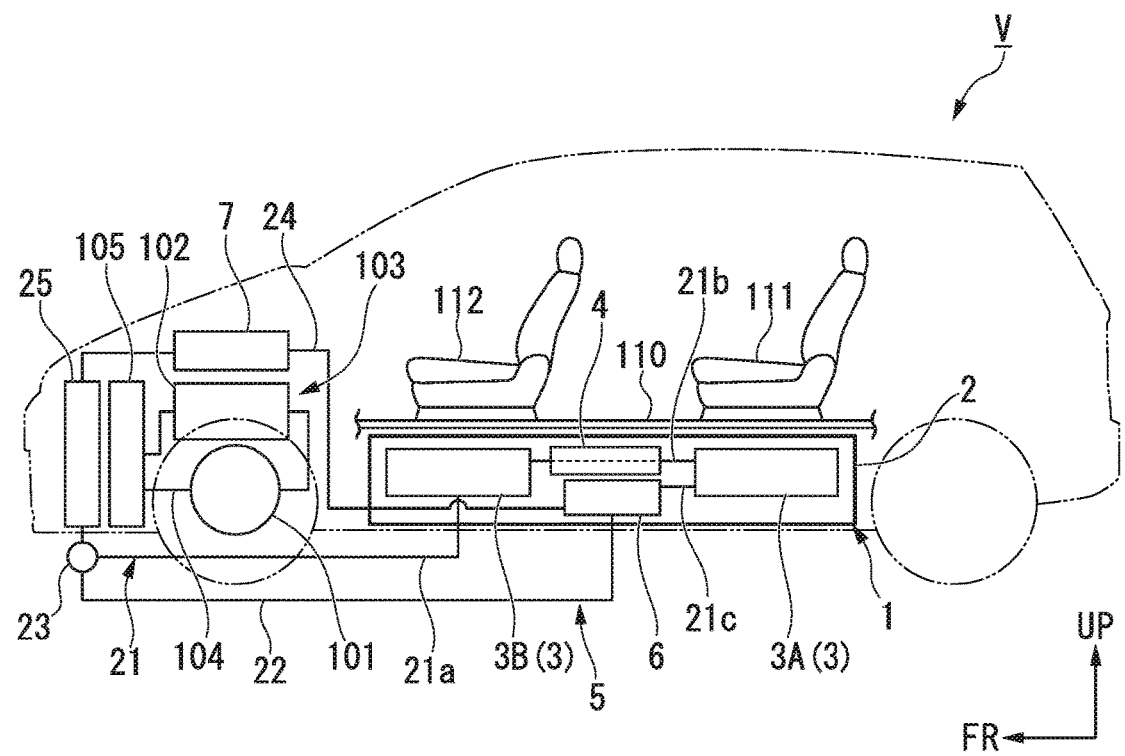
FIG. 1 is a schematic view showing an electric vehicle including a vehicle electric power supply apparatus of an embodiment of the present invention.

As shown in FIG. 1, a vehicle V (electric vehicle V) that includes a vehicle electric power supply apparatus 1 according to the present embodiment is an electric automobile that is driven by a travel motor (rotary electric machine) 101. The vehicle V may be a hybrid automobile or the like that is driven, for example, by the combined use of an engine (internal combustion engine) and the travel motor 101. In FIGS. 1 to 4, an arrow FR indicates a frontward direction of the vehicle V, an arrow UP indicates an upward direction of the vehicle V, and an arrow LH indicates a leftward direction of the vehicle V.

Figure 2:
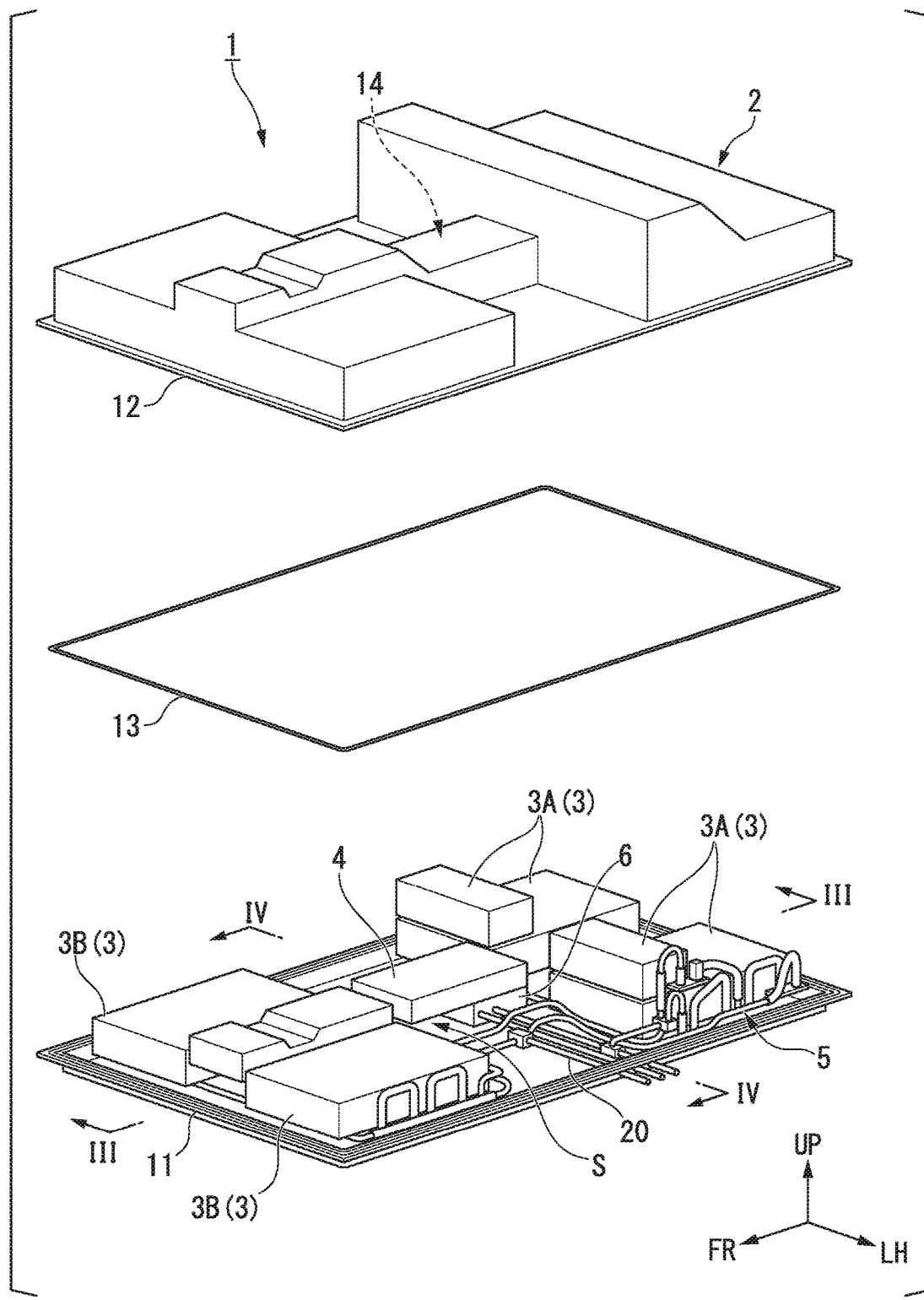
FIG. 2 is an exploded perspective view of the vehicle electric power supply apparatus of the embodiment of the present invention.

As shown in FIGS. 1 and 2, the vehicle electric power supply apparatus 1 according to the present embodiment is arranged below a floor panel 110 of the vehicle V that forms a floor surface of a vehicle room. The vehicle electric power supply apparatus 1 includes a battery case 2, a battery 3, a junction board (first electric device) 4, and a battery cooling circuit 5. The vehicle electric power supply apparatus 1 of the present embodiment also includes a DC-DC converter (second electric device) 6. The vehicle electric power supply apparatus 1 also includes a battery charger 7.

The battery 3, the junction board 4, and part (for example, a pipe 20 shown in FIG. 2) of the battery cooling circuit 5 are arranged in the battery case 2. In the present embodiment, the DC-DC converter 6 is also arranged in the battery case 2.

Figure 3:
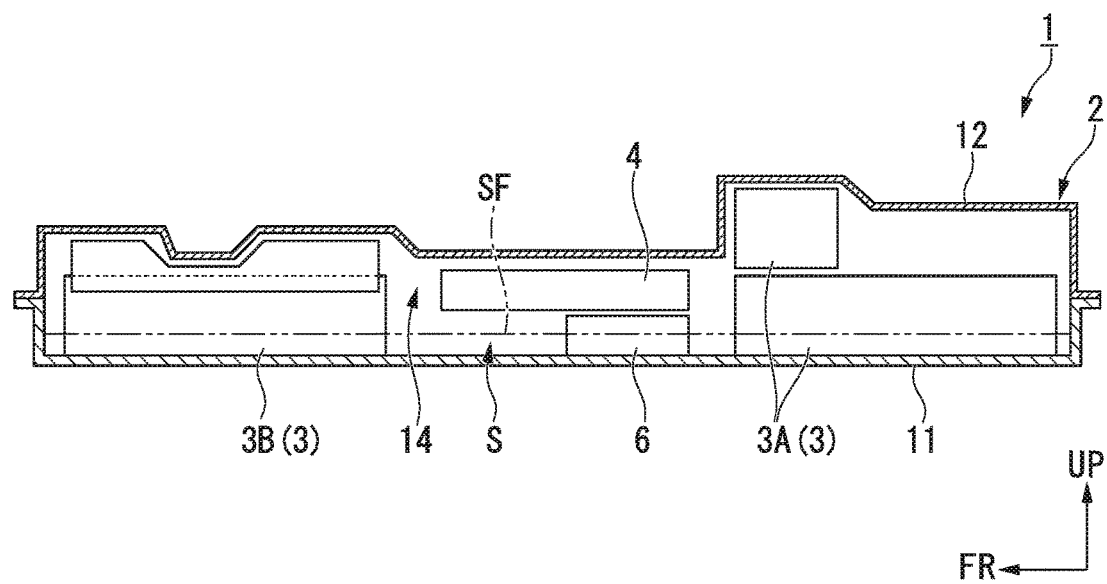
FIG. 3 is a cross-sectional view along a line of FIG. 2.
Figure 4:
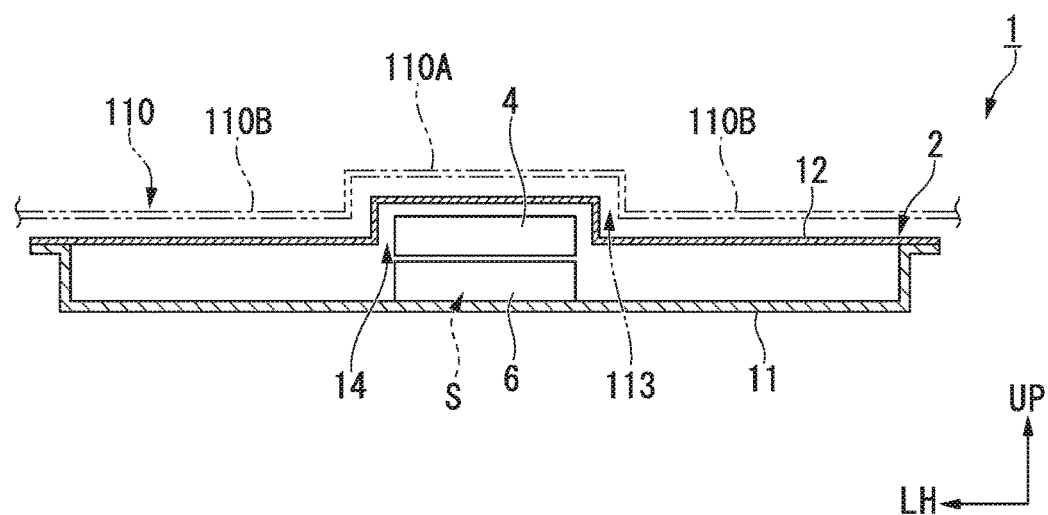
FIG. 4 is a cross-sectional view along a IV-IV line of FIG. 2.

A specific configuration of the battery case 2 may be arbitrary. As shown in FIGS. 2 to 4, the battery case 2 of the present embodiment includes a bottom plate 11 and a cover 12.

The bottom plate 11 mainly constitutes a bottom part of the battery case 2. The battery 3, the junction board 4, and the DC-DC converter 6 are provided on the bottom plate 11.

The bottom plate 11 may be formed, for example, in a simple plate shape but is formed in a box shape that has a bottom and that opens upward in the present embodiment.

The cover 12 is formed in a box shape that has a bottom and that opens downward and mainly constitutes upper and side parts of the battery case 2. A protrusion or a recess that corresponds to the height of each of components such as the battery 3 and the junction board 4 which are arranged on the bottom plate 11 is formed at a region of the cover 12 that constitutes an upper part of the battery case 2.

A fit part between the bottom plate 11 and the cover 12 is sealed via an annular seal member 13 that extends along a circumferential edge part of the bottom plate 11.

There may be, for example, one battery 3, but there are a plurality of batteries 3 in the present embodiment. As shown in FIGS. 1 to 3, the plurality of batteries 3 include a rear battery 3A that is arranged at a rear part (a region that is positioned on a rearward side of the vehicle V) of the battery case 2 and a front battery 3B that is arranged at a front part (a region that is positioned on a frontward side of the vehicle V) of the battery case 2. The rear battery 3A and the front battery 3B are arranged to be spaced in a front-to-rear direction of the vehicle V. Specifically, the rear battery 3A is arranged below a rear seat 111 of the vehicle V. The front battery 3B is arranged below a front seat 112 of the vehicle V.

The rear battery 3A may be arranged, for example, at an arbitrary position such as the middle in a vehicle width direction of a rear part of the battery case 2; however, in the present embodiment, the rear batteries 3A are arranged to be spaced from each other in the vehicle width direction.

The rear battery 3A is formed of a plurality of (in the example of FIG. 2, two) batteries that are stacked such that the height of the front part of the rear battery 3A is higher than the height of the rear part of the rear battery 3A.

The front battery 3B may be arranged, for example, at an arbitrary position such as the middle in the vehicle width direction of a front part of the battery case 2; however, in the present embodiment, two front batteries 3B are arranged to be spaced from each other in the vehicle width direction.

In the present embodiment, the battery capacity of the rear battery 3A is larger than that of the front battery 3B.

Therefore, the amount of heat generation of the rear battery 3A at the time of charging and discharging may be larger than the amount of heat generation of the front battery 3B.

The junction board 4 is connected to the battery 3 described above. As shown in FIGS. 2 to 4, the junction board 4 is arranged to be spaced from the bottom part of the battery case 2. That is, there is a gap S between a lower surface of the junction board 4 and the bottom part of the battery case 2. The lower surface of the junction board 4 that faces the bottom part of the battery case 2 is positioned lower than an upper surface of the battery 3 that faces the upper part of the battery case 2 (specifically, refer to FIG. 3).

The junction board 4 has a function that switches between connection and disconnection between the battery 3 and a load device of the vehicle V or the battery charger 7. The junction board 4 has, for example, a contactor (a cutoff switch), a fuse, and the like. The load device of the vehicle V described above includes an auxiliary machine (not shown) such as an air conditioner and a car navigation system, the travel motor 101, and the like. The load device is arranged outside (for example, the vehicle room of the vehicle V) of the battery case 2.

The junction board 4 of the present embodiment is arranged between the rear battery 3A and the front battery 3B that are arranged in the front-to-rear direction of the vehicle V. The junction board 4 is arranged at the middle in the vehicle width direction of the battery case 2.

The DC-DC converter 6 is connected to the battery 3 described above. Specifically, the DC-DC converter 6 is connected to the battery 3 via the junction board 4 described above. The DC-DC converter 6 is also connected to the auxiliary machine (not shown) such as an air conditioner and a car navigation system.

The DC-DC converter 6 has a function of decreasing the voltage of the battery 3 and then supplying the power of the battery 3 to the auxiliary machine.

In the present embodiment, the amount of heat generation of the DC-DC converter 6 at the time of operation is larger than the amount of heat generation of the battery 3 at the time of charging and discharging.

A waterproof treatment is applied to the DC-DC converter 6. The DC-DC converter 6 to which the waterproof treatment is applied has a configuration in which, for example, a main body part is accommodated in a case in a state of being sealed with respect to the external.

The DC-DC converter 6 is arranged in the gap S between the lower surface of the junction board 4 and the bottom part of the battery case 2. Similarly to the junction board 4, the DC-DC converter 6 is arranged at the middle in the vehicle width direction of the battery case 2.

As described above, both the junction board 4 and the DC-DC converter 6 of the present embodiment are arranged at the middle in the vehicle width direction of the battery case 2. Specifically, the junction board 4 and the DC-DC converter 6 are arranged at a position that corresponds to a center tunnel 14 of the battery case 2. Specifically, the junction board 4 is arranged inside the center tunnel 14.

The center tunnel 14 of the battery case 2 opens downward (toward the bottom part of the battery case 2) and extends in the front-to-rear direction of the vehicle V at a middle part in the vehicle width direction of the cover 12 that constitutes the upper part of the battery case 2. The region of the battery case 2 at which the center tunnel 14 is formed enters a floor tunnel 113 of the floor panel 110 that opens downward (specifically, refer to FIG. 4).

As shown in FIG. 4, in the vehicle V of the present embodiment, a region 110A (first region 110A) of the floor panel 110 at which the floor tunnel 113 is formed, that is, the first region 110A of the floor panel 110 that is arranged above the junction board 4 constitutes a footrest space of an occupant. A region 110B (second region 110B) of the floor panel 110 that is positioned on both sides of the formation region of the floor tunnel 113 in the vehicle width direction also constitutes a footrest space of an occupant. In the present embodiment, the first region 110A and the second region 110B of the floor panel 110 constitutes a footrest space of an occupant who is seated on the rear seat 111. The second region 110B of the floor panel 110 is positioned lower than the first region 110A.

The battery charger 7 shown in FIG. 1 is connected to the battery 3. The battery charger 7 converts AC power that is supplied from an external electric power supply into DC power or converts DC power that is supplied from external electric power and then charges the battery 3. In the present embodiment, the amount of heat generation of the battery charger 7 at the time of operation is larger than the amount of heat generation of the DC-DC converter 6 at the time of operation and the amount of heat generation of the battery 3 at the time of charging and discharging.

The battery charger 7 may be arranged, for example, in the battery case; however, in the present embodiment, the battery charger 7 is arranged outside (for example, in a motor room of the vehicle V) of the battery case 2.

The battery cooling circuit 5 allows the refrigerant to flow through the pipe and thereby cools at least the battery 3. The refrigerant may be at least a liquid (coolant) such as water or oil. The battery cooling circuit 5 of the present embodiment also cools the DC-DC converter 6. Part of the pipe of the battery cooling circuit 5 is arranged in the battery case 2. In FIG. 2, the pipe 20 (a case inner pipe 20) that is arranged in the battery case 2 is shown.

As shown in FIG. 1, the battery cooling circuit 5 of the present embodiment includes a main flow path 21. The main flow path 21 constitutes part of the pipe of the battery cooling circuit 5 and is a flow path that allows the refrigerant to flow through both the battery 3 and the DC-DC converter 6. The battery cooling circuit 5 may be configured, for example, so as to allow the refrigerant to flow through the DC-DC converter 6 and the battery 3 in this order; however, in the present embodiment, the battery cooling circuit 5 is configured so as to allow the refrigerant to flow through the battery 3 and the DC-DC converter 6 in this order. That is, the main flow path 21 of the battery cooling circuit 5 is configured so as to allow the refrigerant to flow through the battery 3 and the DC-DC converter 6 in this order.

The main flow path 21 may allow the refrigerant to flow through, for example, the rear battery 3A, the front battery 3B, and the DC-DC converter 6 in this order. In the present embodiment, the refrigerant is allowed to flow through the front battery 3B, the rear battery 3A, and the DC-DC converter 6 in this order.

The main flow path 21 of the present embodiment includes a first main flow path 21a that allows the refrigerant to flow toward the front battery 3B, a second main flow path 21b that allows the refrigerant to flow from the front battery 3B toward the rear battery 3A, and a third main flow path 21c that allows the refrigerant to flow from the rear battery 3A toward the DC-DC converter 6. The first main flow path 21a extends from the outside of the battery case 2 to the inside of the battery case 2. Therefore, part of the first main flow path 21a is arranged inside the battery case 2. Both the second main flow path 21b and the third main flow path 21c are arranged inside the battery case 2.

The battery cooling circuit 5 of the present embodiment includes a bypass flow path 22 and a switch valve 23.

The bypass flow path 22 is a flow path that constitutes part of the pipe of the battery cooling circuit 5, that branches from the main flow path 21 at a more upstream side in a flow direction of the refrigerant than the battery 3 and the DC-DC converter 6, and that allows the refrigerant to flow through the DC-DC converter 6 in priority to the battery 3. The bypass flow path 22 in the present embodiment is a flow path that allows the refrigerant to not flow through the battery 3 and to flow through the DC-DC converter 6.

The bypass flow path 22 may branch from the main flow path 21, for example, in the battery case 2.

In this case, the entire bypass flow path 22 is arranged inside the battery case 2. The bypass flow path 22 of the present embodiment branches from the main flow path 21 at the outside of the battery case 2. Therefore, the bypass flow path 22 extends from the outside of the battery case 2 to the inside of the battery case 2, and part of the bypass flow path 22 is arranged inside the battery case 2.

The switch valve 23 is provided on a branch part of the main flow path 21 and the bypass flow path 22 and switches the flow of the refrigerant to any of the main flow path 21 and the bypass flow path 22. The switch valve 23 may be, for example, an electromagnetic three-way valve and the like.

The battery cooling circuit 5 cools the battery 3, the DC-DC converter 6, and the battery charger 7 in a state where at least any one of the battery 3, the DC-DC converter 6, and the battery charger 7 is being operated, for example, in a case where the battery 3 is charged, the vehicle V is allowed to travel, or the auxiliary machine is operated. The battery cooling circuit 5 does not cool the battery 3, the DC-DC converter 6, and the battery charger 7 in a state where none of the battery 3, the DC-DC converter 6, and the battery charger 7 is being operated.

In the battery cooling circuit 5 of the present embodiment, the flow of the refrigerant is switched by the switch valve 23 to any of the main flow path 21 and the bypass flow path 22, for example, in accordance with the temperature of the battery 3.

For example, when the temperature of the battery 3 is low due to the environments (for example, a cold climate) around the vehicle V and the like, it is not necessary to cool the battery 3, and therefore, the flow of the refrigerant is switched by the switch valve 23 from the main flow path 21 to the bypass flow path 22. In this state, the battery cooling circuit 5 does not cool the battery 3 and cools the DC-DC converter 6 and the battery charger 7.

On the other hand, when the temperature of the battery 3 is high due to the environments (for example, in the hot sun) around the vehicle V, charging and discharging operations of the battery 3, and the like, the flow of the refrigerant is switched by the switch valve 23 from the bypass flow path 22 to the main flow path 21. In this state, the battery cooling circuit 5 cools the battery 3, the DC-DC converter 6, and the battery charger 7.

Hereinafter, the battery cooling circuit 5 of the present embodiment is further specifically described.

The battery cooling circuit 5 of the present embodiment includes a radiator 25 and a cooling pump (not shown) in addition to the configuration described above. The radiator 25 may be arranged at an arbitrary position of the vehicle V; however, in the present embodiment, the radiator 25 is arranged at a motor room of the vehicle V.

The radiator 25 radiates the heat of the refrigerant into the air. The pipe of the battery cooling circuit 5 constitutes a circulation route that allows the refrigerant to flow from the radiator 25 through the battery 3 and the DC-DC converter 6 and to then return to the radiator 25. The circulation route includes the main flow path 21 that extends from the radiator 25, the bypass flow path 22, and a return flow path 24 that allows the refrigerant to return from the battery 3 and the DC-DC converter 6 to the radiator 25. The return flow path 24 of the present embodiment extends from the DC-DC converter 6 to the radiator 25.

The cooling pump is provided on a way (for example, a position adjacent to the upstream side or the downstream side of the radiator 25) of the circulation route. The cooling pump drives the refrigerant such that the refrigerant flows in the circulation flow path.

The battery cooling circuit 5 of the present embodiment also cools the battery charger 7 by the refrigerant that flows through the pipe.

In the battery cooling circuit 5, for example, the refrigerant may be allowed to flow through the battery charger 7 and may be then allowed to flow through the battery 3 and the DC-DC converter 6. In the battery cooling circuit 5 of the present embodiment, the refrigerant is allowed to flow through the battery 3 and the DC-DC converter 6 and is then allowed to flow through the battery charger 7. That is, the battery charger 7 is arranged on a midway part of the return flow path 24.

In the vehicle electric power supply apparatus 1 of the present embodiment having a configuration as described above, as shown in FIG. 3, the lower surface of the junction board 4 is positioned higher than a fluid level SF of the refrigerant in a state where the refrigerant that flows through the pipe of the battery cooling circuit 5 described above is accumulated inside the battery case 2. The amount (volume) of the refrigerant that can be accumulated inside the battery case 2 may be, for example, equal to the total amount (total volume) of the refrigerant that is used in the battery cooling circuit 5.

As shown in FIG. 1, the vehicle V of the present embodiment includes the travel motor 101, a motor control part 102 that controls the travel motor 101, and a motor cooling circuit 103 in addition to the vehicle electric power supply apparatus 1 described above. The travel motor 101 and the motor control part 102 may be arranged at an arbitrary position of the vehicle V; however, in the present embodiment, both the travel motor 101 and the motor control part 102 are arranged at the motor room.

The travel motor 101 is driven by electric power that is supplied from the battery 3 via the junction board 4 and the motor control part 102. The motor control part 102 converts DC power of the battery 3 into AC power and then supplies the AC power to the travel motor 101. The motor control part 102 may be, for example, a PCU (Power Control Unit) that also has a function of increasing the voltage of the battery 3.

In the present embodiment, the amount of heat generation of the travel motor 101 at the time of operation is larger than the amount of heat generation of the motor control part 102.

The motor cooling circuit 103 allows the refrigerant to flow through a pipe 104 and thereby cools the travel motor 101 and the motor control part 102. The motor cooling circuit 103 cools the travel motor 101 and the motor control part 102 when the vehicle V travels (when the travel motor 101 is operated).

The motor cooling circuit 103 includes the pipe 104 through which the refrigerant flows, a radiator 105, and a cooling pump (not shown). The function and the arrangement of the radiator 105 and the cooling pump may be similar to those of the battery cooling circuit 5. The pipe 104 of the motor cooling circuit 103 constitutes a circulation route that allows the refrigerant to flow from the radiator 105 through the travel motor 101 and the motor control part 102 and to then return to the radiator 105. The pipe 104 of the motor cooling circuit 103 may be configured, for example, so as to allow the refrigerant to flow from the radiator 105 through the travel motor 101 and the motor control part 102 in this order; however, in the present embodiment, the pipe 104 of the motor cooling circuit 103 is configured so as to allow the refrigerant to flow from the radiator 105 through the motor control part 102 and the travel motor 101 in this order.

The motor cooling circuit 103 cools the travel motor 101 and the motor control part 102 in a state where the travel motor 101 and the motor control part 102 are being operated in order to allow the vehicle V to travel. The motor cooling circuit 103 does not cool the travel motor 101 and the motor control part 102 in a state where the travel motor 101 and the motor control part 102 are not being operated, that is, a state where the vehicle V is stopping.

As described above, according to the vehicle electric power supply apparatus 1 of the present embodiment, the lower surface of the junction board 4 is positioned higher than the fluid level SF of the refrigerant that is accumulated inside the battery case 2. Therefore, even when the refrigerant in the pipe of the battery cooling circuit 5 is erroneously discharged into the battery case 2 and is accumulated inside the battery case 2, the junction board 4 is positioned higher than the fluid level SF of the refrigerant that is accumulated inside the battery case 2. Thereby, it is possible to prevent the junction board 4 from being exposed to a liquid.

Further, according to the vehicle electric power supply apparatus 1 of the present embodiment, the lower surface of the junction board 4 is positioned lower than the upper surface of the battery 3. Therefore, it is possible to reduce the height of the vehicle electric power supply apparatus 1 compared to a case in which the junction board 4 is arranged to overlap on the battery 3. In this case, it is possible to prevent the vehicle room space above the floor panel 110 from being decreased (specifically, the height size of the vehicle room space from being decreased).

Therefore, according to the vehicle electric power supply apparatus 1 of the present embodiment, it is possible to prevent the junction board 4 from being exposed to a liquid while reducing the height of the vehicle electric power supply apparatus 1.

Further, according to the vehicle electric power supply apparatus 1 of the present embodiment, the DC-DC converter 6 is arranged in the gap S between the junction board 4 and the bottom part of the battery case 2. That is, the gap S is effectively used for the arrangement of the DC-DC converter 6. Therefore, even when the DC-DC converter 6 is arranged in the battery case 2, it is possible to prevent the size of the vehicle electric power supply apparatus 1 from being increased. In this case, it is possible to prevent the vehicle room space above the floor panel 110 from being decreased.

Further, since a waterproof treatment is applied to the DC-DC converter 6, even when part or all of the DC-DC converter 6 is positioned lower than the fluid level SF of the refrigerant that is accumulated inside the battery case 2, it is possible to prevent a failure from arising at the DC-DC converter 6.

Further, in the vehicle electric power supply apparatus 1 of the present embodiment, the battery cooling circuit 5 is configured to allow the refrigerant to flow through the battery 3 and the DC-DC converter 6 in order. Therefore, it is possible to cool the battery 3 in priority to the DC-DC converter 6. Specifically, when the thermal resistance of the battery 3 is inferior to the DC-DC converter 6 (when the control temperature of the battery 3 is lower than the DC-DC converter 6), it is possible to reliably cool the battery 3 having an inferior thermal resistance without being subject to the effect of the temperature of the DC-DC converter 6.

Further, according to the vehicle electric power supply apparatus 1 of the present embodiment, the battery cooling circuit 5 includes: the main flow path 21 that allows the refrigerant to flow through both the battery 3 and the DC-DC converter 6; the bypass flow path 22 that allows the refrigerant to flow through the DC-DC converter 6 in priority to the battery 3; and the switch valve 23 that switches the flow of the refrigerant to any of the main flow path 21 and the bypass flow path 22. Therefore, it is possible to selectively cool the battery 3.

For example, when the temperature of the battery 3 is low by the effect of surrounding environments (for example, a cold climate) and the like in a state where the battery 3 and the DC-DC converter 6 are being operated, by allowing the refrigerant of the battery cooling circuit 5 to flow through the bypass flow path 22, it is possible to effectively cool the DC-DC converter 6. Further, it is also possible to warm the battery 3 to an appropriate temperature. On the other hand, when the temperature of the battery 3 is high, by allowing the refrigerant of the battery cooling circuit 5 to flow through the main flow path 21, it is possible to cool both the battery 3 and the DC-DC converter 6.

Further, according to the vehicle electric power supply apparatus 1 of the present embodiment, the junction board 4 and the DC-DC converter 6 are arranged at a position (a position at which the junction board 4 and the DC-DC converter 6 are capable of entering the floor tunnel 113) that corresponds to the floor tunnel 113 of the floor panel 110. In general, the floor tunnel 113 is formed in a region of the floor panel 110, which has a small effect on boarding environments (vehicle room environments) of an occupant in the vehicle room. Therefore, it is possible to suitably reduce the effect on the vehicle room environments due to the arrangement of the junction board 4 and the DC-DC converter 6 in the battery case 2.

Further, according to the vehicle V of the present embodiment, the first region 110A of the floor panel 110 that is positioned above the junction board 4 having a reduced height position in the vehicle electric power supply apparatus 1 is used as a footrest space of an occupant. Therefore, it is possible to prevent the height size of the vehicle room space above the footrest space from being decreased. That is, it is possible to prevent the vehicle room space above the floor panel 110 from being decreased (specifically, the height size of the vehicle room space from being decreased).

Further, the vehicle V of the present embodiment includes the motor cooling circuit 103 that cools the travel motor 101 and the motor control part 102 separately from the battery cooling circuit 5 that cools the battery 3, the DC-DC converter 6, and the battery charger 7. Therefore, it is possible to shorten the circulation route of the refrigerant in the cooling circuits 5 and 103 and to efficiently cool each of the battery 3, the DC-DC converter 6, the battery charger 7, the travel motor 101, and the motor control part 102 compared to a case in which the travel motor 101 and the motor control part 102 are also cooled by the battery cooling circuit 5. Specifically, it is not necessary to cool the travel motor 101 and the motor control part 102 in a state where the vehicle V is stopping, and therefore, it is possible to efficiently cool the battery 3, the DC-DC converter 6, and the battery charger 7 by the battery cooling circuit 5 compared to a case in which the travel motor 101 and the motor control part 102 are also cooled by the battery cooling circuit 5.

Although details of the embodiment of the invention has been described, the present invention is not limited to the embodiment described above, and a variety of changes can be added without departing from the scope of the invention.

In the vehicle electric power supply apparatus of the present embodiment, the first electric device is not limited to the junction board and may be, for example, an arbitrary electric device that is arranged inside the battery case and that is connected to the battery, such as a DC-DC converter or a battery charger.

In the vehicle electric power supply apparatus of the present embodiment, the second electric device is not limited to the DC-DC converter and may be, for example, an arbitrary electric device which is arranged in the battery case and to which a waterproof treatment can be applied.

In the vehicle electric power supply apparatus of the present embodiment, for example, the battery cooling circuit may also cool the travel motor and the motor control part of the vehicle. In this case, the vehicle may not include the motor cooling circuit.

What is claimed is:

1. A vehicle electric power supply apparatus that is arranged below a floor panel, comprising:
    a battery case;
    a battery that is arranged in the battery case;
    a first electric device that is arranged in the battery case and that is connected to at least the battery; and
    a battery cooling circuit that is configured to allow a refrigerant to flow through a pipe and cool at least the battery,
    wherein a lower surface of the first electric device is lower than an upper surface of the battery and is positioned higher than a fluid level of the refrigerant in a state where the refrigerant that flows through the pipe is accumulated inside the battery case,
    wherein the vehicle electric power supply apparatus comprises a gap formed by the first electric device arranged to be spaced apart from a bottom part of the battery case, and
    wherein the first electric device is a junction board.

2. The vehicle electric power supply apparatus according to claim 1, comprising
    a second electric device that is arranged in the battery case and that is connected to at least the battery,
    wherein the second electric device is arranged at the gap in a state where a waterproof treatment is applied to the second electric device.

3. The vehicle electric power supply apparatus according to claim 2,
    wherein the battery cooling circuit is configured to allow the refrigerant to flow through the battery and the second electric device in order.

4. The vehicle electric power supply apparatus according to claim 2,
    wherein the battery cooling circuit comprises:
    a main flow path that is configured to allow the refrigerant to flow through both the battery and the second electric device;
    a bypass flow path that branches from the main flow path at a more upstream side in a flow direction of the refrigerant than the battery and the second electric device and that is configured to allow the refrigerant to flow through the second electric device in priority to the battery; and
    a switch valve that is configured to switch a flow of the refrigerant to any of the main flow path and the bypass flow path.

5. The vehicle electric power supply apparatus according to claim 3,
    wherein the battery cooling circuit comprises:
    a main flow path that is configured to allow the refrigerant to flow through both the battery and the second electric device;
    a bypass flow path that branches from the main flow path at a more upstream side in a flow direction of the refrigerant than the battery and the second electric device and that is configured to allow the refrigerant to flow through the second electric device in priority to the battery; and
    a switch valve that is configured to switch a flow of the refrigerant to any of the main flow path and the bypass flow path.

6. An electric vehicle comprising:
    the vehicle electric power supply apparatus according to claim 1; and
    a floor panel that is arranged above the vehicle electric power supply apparatus,
    wherein a region that is part of the floor panel and that is arranged above the first electric device constitutes a footrest space of an occupant.

7. A vehicle electric power supply apparatus that is arranged below a floor panel, comprising:
    a battery case;
    a battery that is arranged in the battery case;
    a first electric device that is arranged in the battery case and that is connected to at least the battery; and
    a battery cooling circuit that is configured to allow a refrigerant to flow through a pipe and cool at least the battery,
    wherein the battery comprises:
    a front battery that is arranged at a front part of the battery case; and
    a rear battery that is arranged at a rear part of the battery case,
    the first electric device is arranged between the front battery and the rear battery in a vehicle front-to-rear direction, and
    a lower surface of the first electric device is lower than an upper surface of the battery and is positioned higher than a fluid level of the refrigerant in a state where the refrigerant that flows through the pipe is accumulated inside the battery case.

8. The vehicle electric power supply apparatus according to claim 7,
    wherein the first electric device is arranged at a middle part in a vehicle width direction of the battery case.

* * * * *